(12) United States Patent
Sommers

(10) Patent No.: US 7,357,404 B2
(45) Date of Patent: Apr. 15, 2008

(54) PROGRESSIVE RATE ATV SUSPENSION LINKAGE

(76) Inventor: Lazarus Sommers, 6748 TR 630, Millersburg, OH (US) 44654

( * ) Notice: Subject to any disclaimer, the term of this patent is extended or adjusted under 35 U.S.C. 154(b) by 334 days.

(21) Appl. No.: 11/161,728

(22) Filed: Aug. 15, 2005

(65) Prior Publication Data
US 2007/0035104 A1  Feb. 15, 2007

(51) Int. Cl.
B62K 19/30 (2006.01)
(52) U.S. Cl. .................. 280/284; 280/285; 280/288.1; 280/288; 280/227
(58) Field of Classification Search ................ 280/284, 280/285, 227, 280, 281.1
See application file for complete search history.

(56) References Cited

U.S. PATENT DOCUMENTS 4,556,119 A * 12/1985 Shiratsuchi ................. 180/219
6,481,523 B1 * 11/2002 Noro et al. .................. 180/227
6,581,711 B1 *  6/2003 Tuluie ........................ 180/227

* cited by examiner

Primary Examiner—Lesley D. Morris
Assistant Examiner—Marlon Arce-Diaz

(57) ABSTRACT

A progressive rear suspension linkage is used in the rear suspension of an ATV to aid in ride quality and safety by changing leverage ratio thru the travel of the rear suspension. The rear shock attaches to it as well as to the frame. The linkage system attaches to the frame at one end and to the rear suspension arm at the other end and changes leverage as the mounting point on the frame and the rear suspension arm come closer together or further apart as the rear suspension arms moves thru its travel. This in turn lets some linkages move in a scissors type movement with the rear shock bolted to it at a given point. This invention provides an improvement to the OEM designs, making for improved handling and safer control of ATVs.

20 Claims, 5 Drawing Sheets

PROGRESSIVE RATE ATV SUSPENSION LINKAGE

BACKGROUND OF THE INVENTION

In the past various rear suspension systems used progressive rate rear linkages but did not allow for adequate up travel of the rear wheels. Many of the rear suspensions used no linkages or used linkages simply for ease of rear shock installation.

Most of the rear suspensions were derived from testing on motorcycles, which have very different needs from the current high performance ATVs.

The present invention is a rear suspension linkage designed to allow for the correct up travel of the rear wheels, the correct down travel of the rear wheels, and provide a progressive decrease of leverage ratio thru the up travel of the rear suspension. This gives faster shock shaft travel speeds as the rear wheels move upward in relationship to the ATV.

SUMMARY OF THE INVENTION

The progressive rate suspension linkage system is an improvement for the rear suspension on all terrain vehicles, also known as ATVs, quads, and 4 wheelers just to name a few names. This invention is an improved way of applying a progressive (rising rate) linkage suspension system to ATV suspension.

Progressive linkage has been around for many years. It was initially designed for motorcycles and has not had all the capabilities that are needed in today's high performance ATVs. With the development of higher horsepower production engines, the speeds have steadily increased and the need for better and safer suspension has rapidly increased.

What progressive linkage does is change the leverage ratio as it relates to the rear shock travel verses rear wheel travel. As the wheels move up thru their travel, the leverage ratio decreases providing better bottoming resistance verses a non-linkage type rear suspension system. This in turn provides progressively faster shock shaft travel speeds as the ATV rear wheels move up thru their travel, providing progressively better resistance to bottoming.

Motorcycles have used good progressive linkages for many years but their needs are very different from their 4-wheeled counterparts since a lower center of gravity is a great need for good handling on an ATV, and the ATV needs much more up travel of the rear wheels in relationship to the frames distance from the ground.

If the progression ratio is incorrect or the rear wheel travel is in the wrong location, then the progressive linkage does not work nearly as well or as safely as it could.

Different manufactures and different ATVs use different physical parts to achieve the progressive ratio that they have built into the ATVs.

The 3 key points that this linkage design addresses are: The correct up travel, the correct down travel, and the correct progression ratio (or rising rate).

The correct up travel mentioned in [Para 10] being defined as—compressed shock length to be the same as the length from center to center of the rear shock mounts when the rear tires that are being used and aired up to the pressure at which they will be used are installed on the ATV and the frame and/or chassis skid plate is ½ to 1½ inches off the ground at the foot peg area or rear of the frame.

The correct down travel mentioned in [Para 10] being defined as—the extended shock length being the same as the length from center to center of the rear shock mounts when the rear tires that are being used and aired up to the pressure at which they will be used, are installed on the ATV and the frame and/or chassis skid plate is 11.5 to 12.5 inches off the ground at the foot peg area or rear of the frame.

The correct progression ratio mentioned in [Para 10] is then measured with a starting point of the frame at 1.5 inches off of the ground to an ending point with the frame 12 inches off of the ground. This progression ratio is the percentage of rise in shock shaft speed and how it relates to the progressive rising rate that it give to the resistance to bottoming of the suspension, and is calculated by using the formulae in [Para 20]. The correct progression ratio is equal to 24% to 69%. The progression ratio is then calculated using the leverage ratio at 1.5 inches verses the leverage ratio at 12 inches. The correct progression ratio will vary within 24% to 69% depending on the application that it is to be used in.

All the measurements mentioned in [Para 11, 12 and 13] are to be taken with the frame lower flat area being level (to the ground) on frames with similar rake (or upward tilt) in the front end as the 2004 TRX450R. On frames with less rake angle in the frame such as the 2004 YFZ450, the frame needs to be raised 2 inch in the front (22 inches forward of the foot pegs) when taking all measurements.

The progression ratio that is the subject of this invention can be achieved in various ways, depending on the location of the upper shock mount, linkage mount point to the frame and linkage mount point to the suspension arm.

The attached drawings of linkages that represent this invention are only examples of this invention. This invention is in no way limited to these linkages and examples.

The progression ratio graph shown in drawing 5 was taken from an ATV with this invention installed and is simply an example of this invention.

This invention differs from current linkages: Most of the OEM linkages have progression rates well over 80% and the aftermarket suppliers such as Walsh Racecraft and Lonestar have progression ratios well below 20%.

[Para 20] is an example of the formulas used to calculate the progression ratio based on the data acquisition used by Race Tech to measure this on an ATV. The progression ratios specified in this invention are based on that method of measurement and calculation.

The formula for calculating the progression ratio of the rear suspension on an ATV is as follows: Progression ratio=$(1.00-((1/B)/(1/A))\times 100$ and is expressed as a percentage. Using as an example a 2005 YFZ450 with the progressive linkage system from this invention installed, with the frame 12 inches off of the ground the leverage ratio measured 1:4.50. On the same ATV with the frame 1.5 inches off of the ground the leverage ratio measured 1:1.75. The resulting progression ratio=61%.

Definition List 1

| Term | Definition |
| --- | --- |
| Progression ratio formula | $(1.00 - ((1/B)/(1/A))) \times 100$ |
| Formula term "B" | Leverage ratio at a frame height of 12 Inches of the ground. |
| Formula term "A" | Leverage ratio at a frame height of 1.5 Inches of the ground. |

BRIEF DESCRIPTION OF THE DRAWINGS

The lower horizontal line in both FIGS. 2 and 3 represent the ground level.

The large circle in the rear of the suspension arm in both FIGS. 2 and 3 represent 20inch tires.

FIGS. 1, 2, 3, 4, and 5 are only examples of this invention applied to an ATV. This invention is in no way limited to the applications used for examples.

Figure 1:
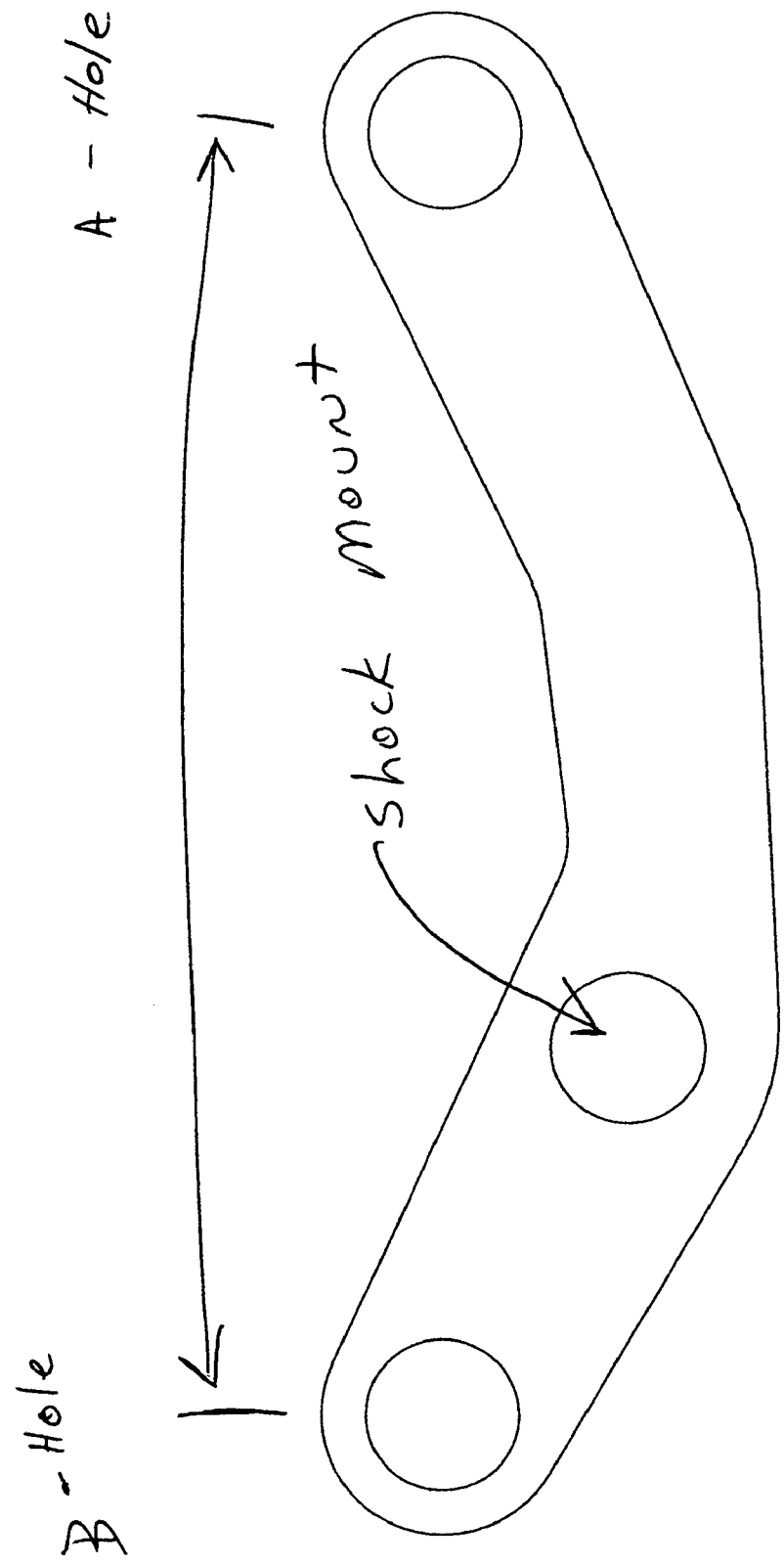
FIG. 1 is a side view of the linkage used to apply this invention to the 2005 TRX450R Honda with 20inch rear tires. To apply this invention to the ATV mentioned, this link was manufactured with hole labeled A and hole labeled B, 8 mm further apart then the OEM linkage to achieve the desired progression ratio. The shock mount hole was then repositioned to achieve the desired up travel as well as the desired down travel of the rear suspension.
Figure 2:
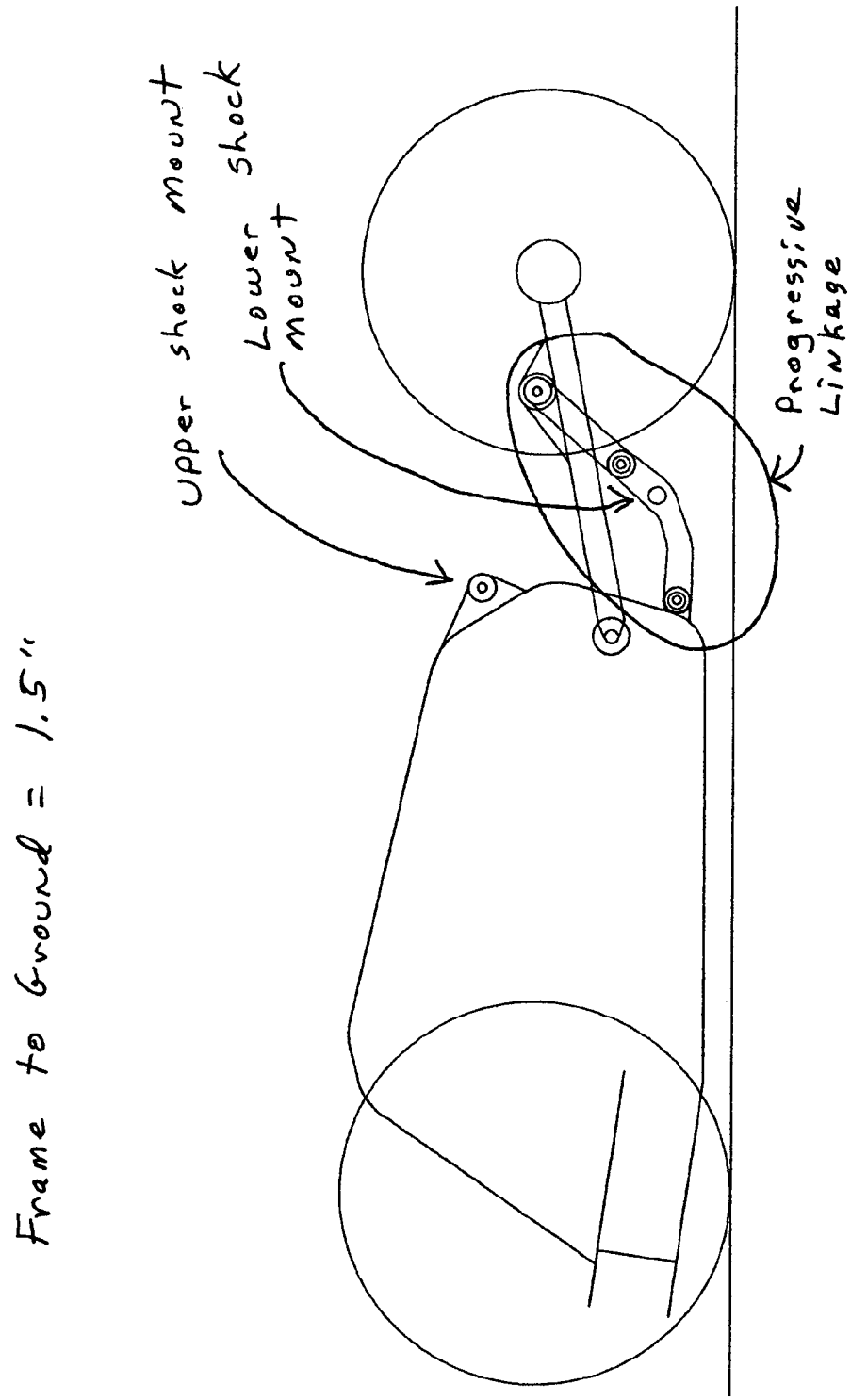
FIG. 2 is a side view of a TRX450R frame and rear suspension member with the linkage mentioned in [Para 1] of this description, and [Para 21] of the original application, installed in place and the frame positioned 1.5 inches of the ground.
Figure 3:
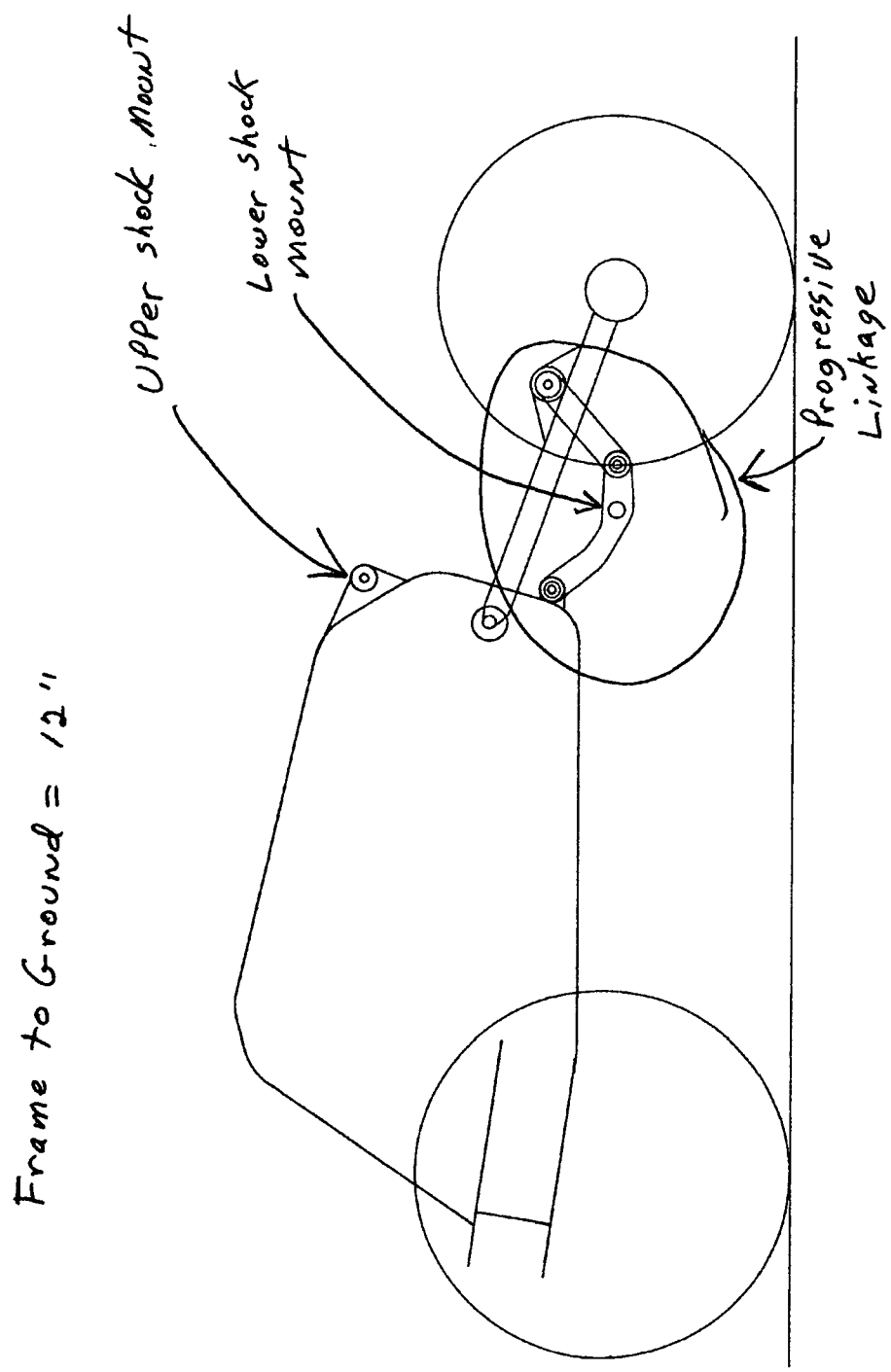
FIG. 3 is the same as mentioned in [Para 2] of this description, and [Para 22] of the original application, but with the frame 12 inches of the ground.
Figure 4:
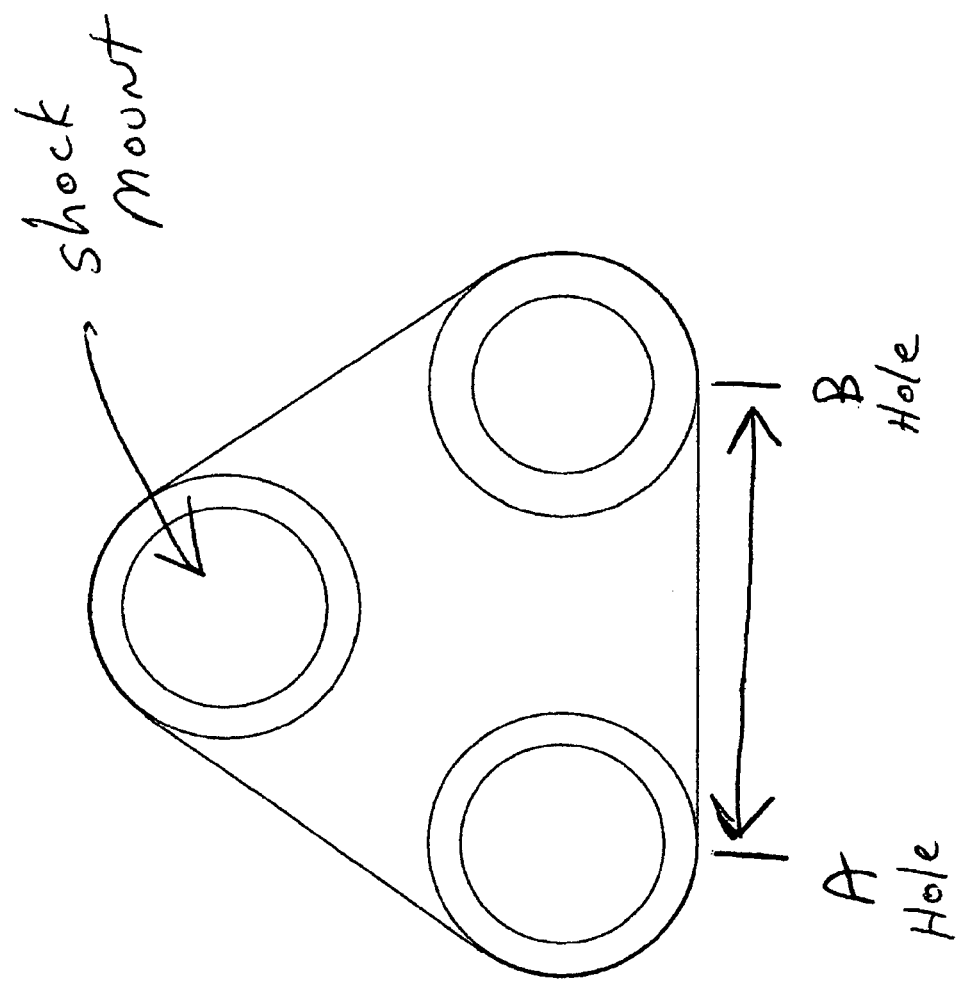
FIG. 4 is a side view of a linkage that is used to apply this invention to a 2005 YFZ450 Yamaha. Holes A and B were spread 7.5 mm from the OEM position to achieve the desired progression ratio and the shock mount was relocated to achieve the corrected up and down travel of the rear wheels.
Figure 5:
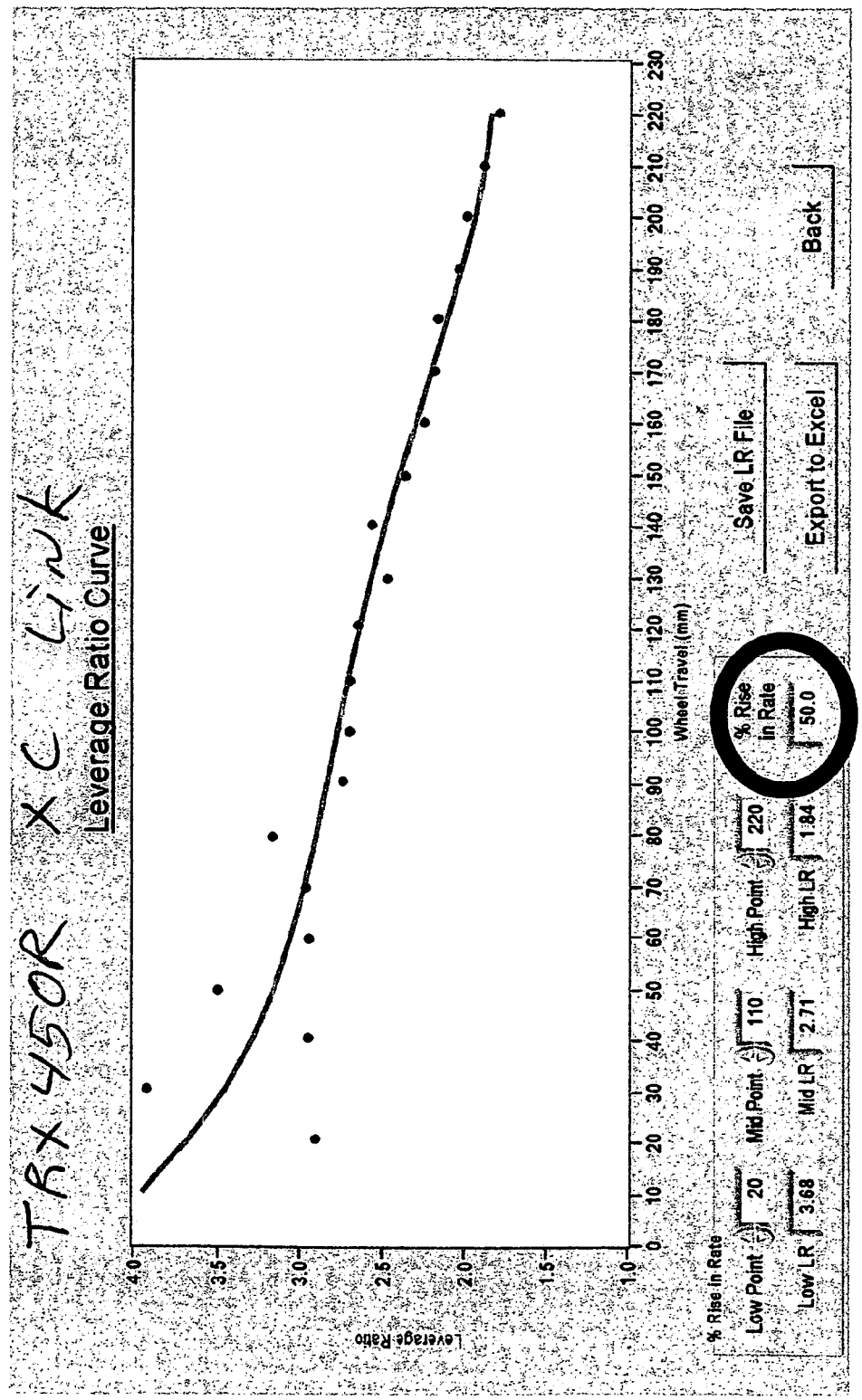
FIG. 5 is a graph showing the progression ratio of an ATV with this invention installed.

What is claimed is:

1. An ATV rear suspension linkage to create a progression ratio through the rear wheel's travel range of suspension, the rear suspension linkage comprising at least a first link and a second link, the first link comprising at least a first opening for mounting the first link to an ATV frame and a second opening for mounting to the second link, the second link comprising at least a first opening for mounting to an ATV swing arm and a second opening for mounting to the first link, and one of the first link and the second link further comprising a shock mount opening for mounting to an ATV rear shock absorber, wherein the rear suspension linkage provides a progression ratio of between approximately 24% and 69% when the distance between the frame of the ATV and the ground is between 1.5 inches and 12.0 inches.

2. The ATV rear suspension linkage of claim 1, wherein an up travel of the ATV rear suspension is equal to a distance between the rear shock mounts as measured at the center point of a shock mount on the ATV and the shock mount opening on the rear suspension linkage when a distance between the ground and the ATV frame is approximately 1.5 inches and the rear shock absorber is compressed.

3. The ATV rear suspension linkage of claim 1, wherein a down travel of the ATV rear suspension is equal to a distance between the rear shock mounts as measured at the center point of a shock mount on the ATV and the shock mount opening or the rear suspension linkage when the distance between the ground and the ATV frame is approximately 2.0 inches and the rear shock absorber is extended.

4. The ATV rear suspension linkage of claim 1, wherein the progression ratio of the rear linkage increases a shock shaft speed through the up travel.

5. The ATV rear suspension linkage of claim 1, wherein the progression ratio of 24% to 69% is calculated according to the formula:

(1.00−((1/B)/(1/A)×100, wherein

A comprises a leverage ratio at an ATV frame height of 1.5 inches off the ground, and B comprises a leverage ratio at an ATV frame height of 12 inches off the ground.

6. The ATV rear suspension linkage of claim 1, wherein the linkage is configured to mount to the ATV frame or ATV suspension arm in conjunction with an original equipment manufactured (OEM) linkage or after market linkage for another part of the connection on some ATV models and applications, and attaches without the use of other OEM or aftermarket linkages in other applications.

7. The ATV rear suspension linkage of claim 1, wherein the first link comprises the shock mount opening for mounting to the ATV rear shock absorber.

8. The ATV rear suspension linkage of claim 1, wherein the second link comprises the shock mount opening for mounting to the ATV rear shock absorber.

9. The ATV rear suspension linkage of claim 2, wherein the up travel of the ATV rear suspension is equal to the distance between the rear shock mounts as measured at the center point of a shock mount on the ATV and the shock mount opening on the rear suspension linkage when the distance between the ground and the ATV frame is 1.5 inches and the rear shock absorber is compressed.

10. The ATV rear suspension linkage of claim 3, wherein the down travel of the ATV rear suspension is equal to the distance between the rear shock mounts as measured at the center point of a shock mount on the ATV and the shock mount opening on the rear suspension linkage when the distance between the ground and the ATV frame is 12 inches and the rear shock absorber is extended.

11. The ATV rear suspension linkage of claim 1, wherein the rear suspension linkage consists of the first link and the second link.

12. The ATV rear suspension linkage e of claim 1, wherein the rear suspension linkage is mounted to an ATV.

13. The ATV rear suspension linkage of claim 1, wherein for purposes of measuring the distance between the ATV frame an the ground, the measurement on the ATV frame is measured at one of the ATV foot peg area and the rear of the ATV frame.

14. The ATV rear suspension linkage of claim 1, wherein for measuring the distance between the ATV frame and the ground, an ATV frame lower flat area is level with the ground on ATV frames having a rake similar to a front end of a 2004 Honda YFZ450 and the ATV frame is raised 0.5 in the front at a point approximately 22 inches forward of the foot pegs for an ATV frame with less rake than the 2004 Honda YFZ450.

15. A method of providing rear suspension to an ATV, the suspension having a progression ratio through an ATV rear wheel's travel range of suspension, the method comprising providing at least a first link and a second link, wherein:

the first link comprises at least a first opening for mounting the first link to an ATV frame and a second opening for mounting to the second link, the second link comprises at least a first opening for mounting to an ATV swing arm and a second opening for mounting to the first link, and one of the first link and the second link further comprises a shock mount opening for mounting to an ATV rear shock absorber, wherein the ATV rear suspension linkage provides a progression ratio of between approximately 24% and 69% when the distance between the ATV frame and the ground is between approximately 1.5 inches and approximately 12.0 inches.

16. The method of claim 15, further comprising:

mounting the first opening in the first link to the ATV vehicle frame and the second opening to the second link, mounting the first opening in the second link to the ATV swing arm of the ATV, and mounting the ATV rear shock absorber to the shock mount opening in one of the first link and the second link.

17. The method of claim 15, wherein the ATV rear suspension linkage provides a progression ratio of between approximately 24% and 69% when the distance between the frame of the vehicle and the ground is between 1.5 inches and 12 inches.

18. An ATV comprising a rear suspension linkage having at least a first link and a second link, the rear suspension linkage having a progression ratio through a ATV rear wheel's travel range of suspension, wherein:
   the first link comprises at least a first opening mounted to an ATV vehicle frame and a second opening mounted to the second link;
   the second link comprises at least a first opening mounted to a swing arm of the ATV and a second opening mounted to the first link; and
   one of the first link and the second link further comprises a shock mount opening mounted to an ATV rear shock absorber, wherein the ATV rear suspension linkage provides a progression ratio of between approximately 24% and 69% when the distance between the ATV frame and the ground is between approximately 1.5 inches and approximately 12.0 inches.

19. The ATV of claim 18, wherein the rear suspension linkage provides a progression ratio of between approximately 24% and 69% when the distance between the ATV frame and the ground is between 1.5 inches and 12 inches.

20. The ATV of claim 18, wherein the progression ratio of 24% to 69% is calculated according to the formula:

$$(1.00-((1/B)/(1/A)))\times 100, \text{ wherein}$$

A comprises a leverage ratio at an ATV frame height of 1.5 inches off the ground, and B comprises a leverage ratio at art ATV frame height of 12 inches off the ground.

* * * * *